United States Patent
Bohler et al.

(10) Patent No.: US 9,170,390 B2
(45) Date of Patent: Oct. 27, 2015

(54) ARMORED FIBER OPTIC ASSEMBLIES AND METHODS OF FORMING FIBER OPTIC ASSEMBLIES

(75) Inventors: Gregory B. Bohler, Lenoir, NC (US); Julian L. Greenwood, III, Hickory, NC (US); Keith A. Greer, Morganton, NC (US); Wesley B. Nicholson, Hickory, NC (US); Kimberly D. Slan, Hickory, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 1140 days.

(21) Appl. No.: 13/089,296

(22) Filed: Apr. 18, 2011

(65) Prior Publication Data
US 2011/0262087 A1    Oct. 27, 2011

Related U.S. Application Data

(60) Provisional application No. 61/327,335, filed on Apr. 23, 2010.

(51) Int. Cl.
G02B 6/44    (2006.01)

(52) U.S. Cl.
CPC .............. G02B 6/443 (2013.01); G02B 6/4486 (2013.01)

(58) Field of Classification Search
CPC ............................... G02B 6/443; G02B 6/4435
See application file for complete search history.

(56) References Cited

U.S. PATENT DOCUMENTS

| | | | |
|---|---|---|---|
| 4,181,647 A | 1/1980 | Beach | |
| 4,514,036 A | 4/1985 | McDonald | |
| 4,548,664 A * | 10/1985 | Canivet | 156/166 |
| 4,743,085 A | 5/1988 | Jenkins et al. | |
| 4,814,133 A | 3/1989 | Matsuno et al. | 264/174 |
| 4,818,060 A * | 4/1989 | Arroyo | 385/103 |
| 4,946,237 A | 8/1990 | Arroyo et al. | |
| 5,126,167 A | 6/1992 | Matsuno et al. | |
| 5,305,411 A | 4/1994 | Arroyo | 385/109 |
| 5,615,293 A | 3/1997 | Sayegh | 385/102 |
| 5,892,873 A | 4/1999 | Tatat | 385/107 |
| 5,920,671 A | 7/1999 | Smith | 385/102 |
| 6,233,384 B1 | 5/2001 | Sowell, III et al. | 385/107 |
| 6,898,354 B2 | 5/2005 | Kim et al. | 385/100 |
| 6,906,264 B1 | 6/2005 | Grant, Jr. et al. | |
| 6,909,264 B2 | 6/2005 | Del Gatto et al. | 323/268 |
| 7,025,509 B2 | 4/2006 | Martin | 385/86 |

(Continued)

FOREIGN PATENT DOCUMENTS

| | | |
|---|---|---|
| CN | 87103827 A | 6/1988 |
| JP | 11-223752 | 8/1999 |
| WO | WO93/09457 | 5/1993 |
| WO | WO95/35196 | 12/1995 |

OTHER PUBLICATIONS

Advisory Action for U.S. Appl. No. 12/768,158 mailed Nov. 6, 2012, 4 pages.

(Continued)

*Primary Examiner* — Omar R Rojas
(74) *Attorney, Agent, or Firm* — William D. Doyle

(57) ABSTRACT

Cables have dielectric armors with armor profiles that provide additional crush and impact resistance for the optical fibers and/or fiber optic assembly therein, while retaining flexibility to aid during installation. The armored cables recover substantially from deformation caused by crush loads.

11 Claims, 7 Drawing Sheets

(56) References Cited

U.S. PATENT DOCUMENTS

| | | |
|---|---|---|
| 7,064,276 B2 | 6/2006 | Sakabe et al. ............ 117/110 R |
| 7,196,272 B2 | 3/2007 | Glew ........................ 174/113 C |
| 7,202,418 B2 | 4/2007 | Glew ........................ 174/113 C |
| 7,266,886 B2 | 9/2007 | Estienne et al. |
| 7,313,304 B2 | 12/2007 | Andrews et al. ............. 385/107 |
| 7,336,873 B2 | 2/2008 | Lail et al. |
| 7,702,203 B1* | 4/2010 | Bohler et al. ................ 385/107 |
| 7,844,148 B2 | 11/2010 | Jenkins et al. ................ 385/39 |
| 7,845,069 B2 | 12/2010 | Franklin et al. ................ 29/825 |
| 8,218,925 B2 | 7/2012 | Bohler et al. |
| 8,331,748 B2 | 12/2012 | Register, III |
| 2001/0007604 A1 | 7/2001 | Lail |
| 2003/0161596 A1 | 8/2003 | Register, III et al. |
| 2003/0202756 A1 | 10/2003 | Hurley et al. ................ 385/101 |
| 2004/0120663 A1 | 6/2004 | Lail et al. |
| 2004/0234215 A1* | 11/2004 | Serrano et al. ................ 385/100 |
| 2005/0013573 A1 | 1/2005 | Lochkovic et al. |
| 2005/0098342 A1 | 5/2005 | Sakabe et al. |
| 2005/0196113 A1 | 9/2005 | Hurley et al. ................ 385/109 |
| 2006/0029340 A1 | 2/2006 | Andrews et al. |
| 2006/0280413 A1 | 12/2006 | Paschal et al. |
| 2008/0253723 A1 | 10/2008 | Stokes et al. ................ 385/114 |
| 2009/0139084 A1 | 6/2009 | Franklin et al. ................ 29/825 |
| 2010/0278492 A1 | 11/2010 | Bohler et al. |
| 2012/0251061 A1 | 10/2012 | Bohler et al. |

OTHER PUBLICATIONS

Final Office Action for U.S. Appl. No. 12/768,158 mailed Aug. 16, 2012, 19 pages.
First Office Action for Chinese Patent Application No. 200910209613.5 mailed Aug. 31, 2012, 7 pages.
First Office Action for Chinese Patent Application No. 201010146116.8, mailed Nov. 12, 2012, 5 pages.
Non-Final Office Action for U.S. Appl. No. 13/494,129 mailed Aug. 16, 2012, 7 pages.
Non-Final Office Action for U.S. Appl. No. 12/718,044 mailed Jan. 6, 2012, 12 pages.
Non-Final Office Action for U.S. Appl. No. 12/261,645 mailed Oct. 6, 2009, 13 pages.
Non-Final Office Action for U.S. Appl. No. 12/748,925 mailed Jul. 24, 2012, 13 pages.
Non-Final Office Action for U.S. Appl. No. 12/768,158 mailed Jan. 5, 2012, 18 pages.
Non-Final Office Action for U.S. Appl. No. 13/673,203 mailed Feb. 1, 2013, 9 pages.
Notice of Allowance for U.S. Appl. No. 13/494,129 mailed Oct. 29, 2012, 9 pages.
Notice of Allowance for U.S. Appl. No. 12/718,044 mailed Apr. 6, 2012, 8 pages.
Notice of Allowance for U.S. Appl. No. 12/261,645 mailed Feb. 12, 2010, 8 pages.
Notice of Allowance for U.S. Appl. No. 12/748,925 mailed Nov. 27, 2012, 9 pages.
Notice of Allowance for U.S. Appl. No. 12/888,865 mailed Sep. 19, 2012, 9 pages.
Restriction Requirement for U.S. Appl. No. 12/261,645 mailed Jun. 26, 2009, 9 pages.
Restriction Requirement for U.S. Appl. No. 12/748,925 mailed Apr. 27, 2012, 6 pages.

* cited by examiner

US 9,170,390 B2

ARMORED FIBER OPTIC ASSEMBLIES AND METHODS OF FORMING FIBER OPTIC ASSEMBLIES

RELATED APPLICATIONS

This application claims the benefit of U.S. Prov. App. No. 61/327,335, filed Apr. 23, 2010, the entire contents of which are hereby incorporated by reference.

This application is related to U.S. application Ser. No. 12/261,645, filed Oct. 30, 2008, now U.S. Pat. No. 7,702,203, U.S. Prov. App. 61/174,059, filed Apr. 30, 2009, and U.S. application Ser. No. 12/748,925, filed Mar. 29, 2010 and published as US 2010/0260459.

TECHNICAL FIELD

The present disclosure relates generally to optical fiber assemblies, and in particular relates to armored fiber optic assemblies having dielectric armor.

BACKGROUND

Fiber optic cables and assemblies should preserve optical performance when deployed in the intended environment while also satisfying any other requirements for the environment. Indoor cables for riser and/or plenum spaces, for example, may require certain flame-retardant ratings as well as mechanical requirements. Mechanical characteristics such as crush performance, permissible bend radii, and temperature performance in part determine how installation and use of the cable in the installation space affect optical performance of the cable.

SUMMARY

According to a first embodiment, an armored fiber optic assembly comprises a fiber optic assembly having at least one optical fiber and a dielectric armor surrounding the fiber optic assembly. The dielectric armor comprises an inner dielectric layer surrounding the fiber optic assembly, and an outer dielectric layer wound around the inner layer and bonded thereto.

According to a second embodiment, an armored fiber optic assembly comprises a fiber optic assembly having at least one optical fiber and a dielectric armor surrounding the fiber optic assembly. The dielectric armor comprises an inner dielectric layer spirally wound around the fiber optic assembly, wherein the outer layer has the shape of a strip; and an outer dielectric layer surrounding the inner layer and bonded thereto, wherein the outer layer has an armor profile.

According to a third embodiment, a method of forming an armored fiber optic assembly comprises providing a fiber optic assembly comprising at least one optical fiber, extruding an inner layer of a dielectric armor around the fiber optic assembly, wherein extruding the inner layer comprises diverting a flow of an inner extrusion material with a first profiling feature to form a spiral strip, and extruding an outer layer of the dielectric armor around the inner layer from an outer extrusion material that is less rigid than the inner extrusion material, wherein the outer layer becomes at least partially bonded to the inner layer.

According to a fourth embodiment, a method of forming an armored fiber optic assembly comprises providing a fiber optic assembly comprising at least one optical fiber, extruding a first layer of a dielectric armor around the fiber optic assembly, wherein extruding the first layer comprises diverting a flow of a first extrusion material with a first profiling feature rotating in a first direction, and extruding a second layer of a dielectric armor around the fiber optic assembly, wherein extruding the second layer comprises diverting a flow of an second extrusion material with a second profiling feature rotating in a second direction.

BRIEF DESCRIPTION OF THE DRAWINGS

The accompanying drawings are included to provide further understanding of the invention. The drawings illustrate the various example embodiments of the invention and, together with the description, serve to explain the principals and operations of the invention.

DETAILED DESCRIPTION

Figure 1:
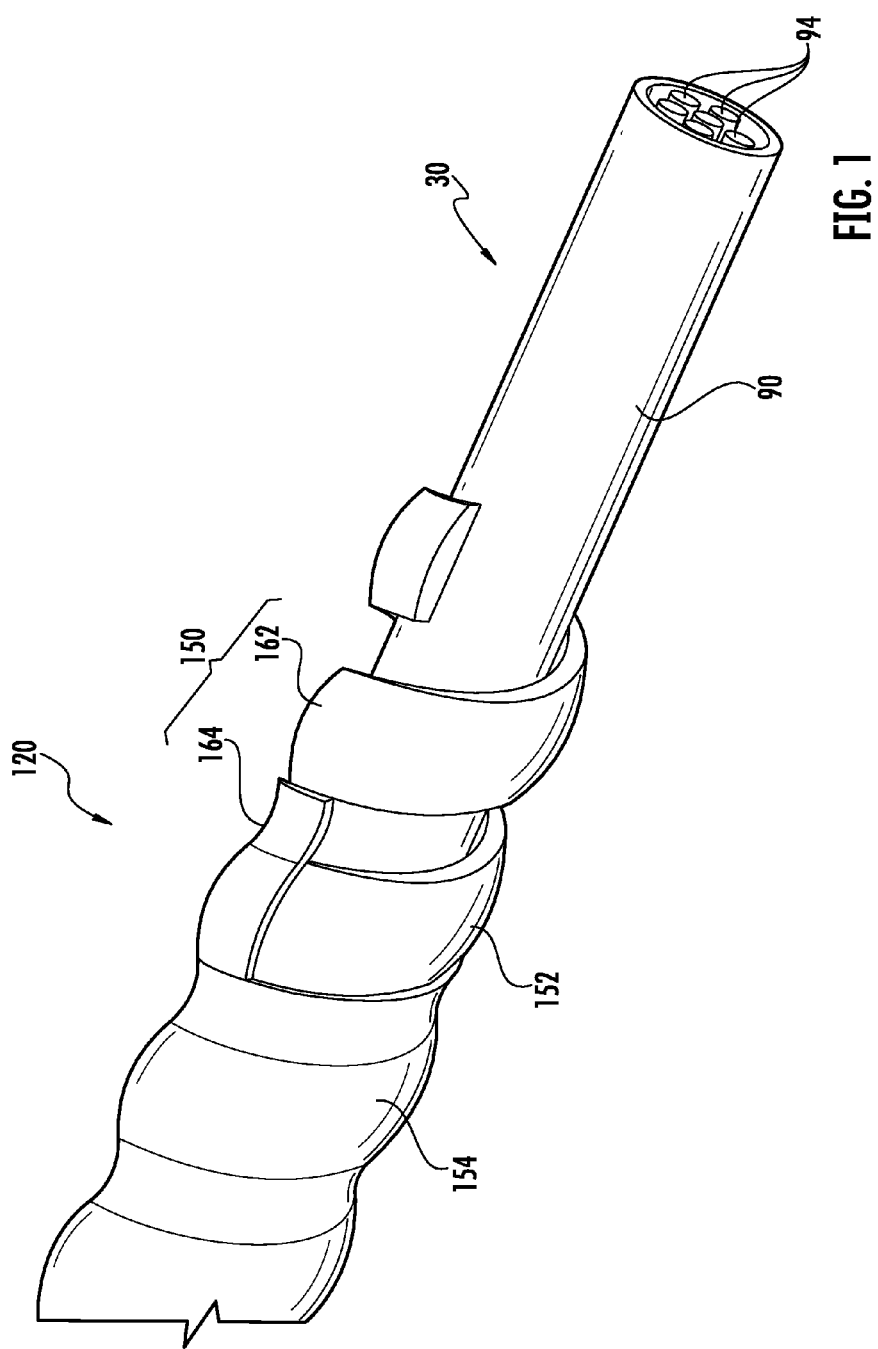
FIG. 1 is a perspective view of a first example embodiment of an armored fiber optic assembly having a dielectric armor.

Reference is now made in detail to exemplary embodiments of the invention, examples of which are illustrated in the accompanying drawings. Whenever possible, identical or similar reference numerals are used throughout the drawings to refer to identical or similar parts.

FIG. 1 is a perspective cut-away view of an armored fiber optic assembly 120 including a core fiber optic assembly 30 disposed within a dielectric armor 150. The dielectric armor 150 is non-conductive and has an outer surface 152 that includes an armor profile 154 generally formed in a spiral along a longitudinal axis. As used herein, "armor profile" means that the outer surface has an undulating surface along its length that looks similar to conventional metal armors (i.e., a undulating shape along the length of the armor). The dielectric armor 150 is advantageous in that it both provides crush resistance and recovers to assume its original shape when subjected to crush loads. The dielectric armor 150 may also meet flame and/or smoke ratings, and does not require electrical grounding.

The dielectric armor 150 includes an inner layer 162 and an outer layer 164 disposed on the outer surface of the inner layer 162. According to one aspect of the present embodiment, the inner layer 162 can have the shape of a spiral "strip" that winds around the core fiber optic assembly 30. The outer layer 164 can be a continuous cover or coating over the exterior of the inner layer 162. The inner layer 162 can be more rigid than the outer layer 164. Accordingly, the Shore D hardness of the inner layer 162 can be more than the Shore D hardness of the outer jacket layer 164. An inner surface 166 of the inner layer 162 may also have an armor profile.

In the illustrated embodiment, the outer layer 164 has a "continuous annular cross-section". As used herein, "continuous annular cross-section" means there are no spiral grooves, openings, or slits that cut entirely through the layer 164. The exemplary inner layer 162 has the form of a strip wound around the core fiber optic assembly 30. The outer layer 164 can be extruded directly onto the inner layer 162 so that the two layers are bonded or adhered together. The inner layer 162 may be constructed of a relatively rigid polymer, while the outer layer 164 can be relatively less rigid. The relatively rigid inner layer 162 accordingly provides tensile strength, resistance to crush, and other robust properties. However, because the inner layer 162 has the shape of a spiral strip, and because the outer layer 164 can be relatively less rigid, the armored fiber optic assembly 120 can be relatively flexible and easy to bend. The thickness, width, and composition of the "strip" that forms the inner layer 162 can be selected to provide desirable mechanical properties. In general, the outer layer 164 completely covers the inner layer 162. The fiber optic assembly 30 is housed within and protected by the dielectric armor 150.

In the illustrated embodiment, the fiber optic assembly 30 is a fiber optic cable having an extruded polymer cable jacket 90 and a plurality of tight-buffered optical fibers 94 extending longitudinally through the assembly 120 within the cable jacket 90. Strength elements (not shown), such as aramid fibers, may also extend longitudinally through the cable jacket 90. In one embodiment, the cable jacket 90 can be omitted. The armor 150 need not be secured to the core assembly 30 and may be separated from the core assembly 30 by a free space or separation distance. An average or median separation ΔR can therefore be calculated as ΔR=RI−RC, where RI is the average inside radius of the armor, and RC is the average outside radius of the core assembly.

Figure 2:
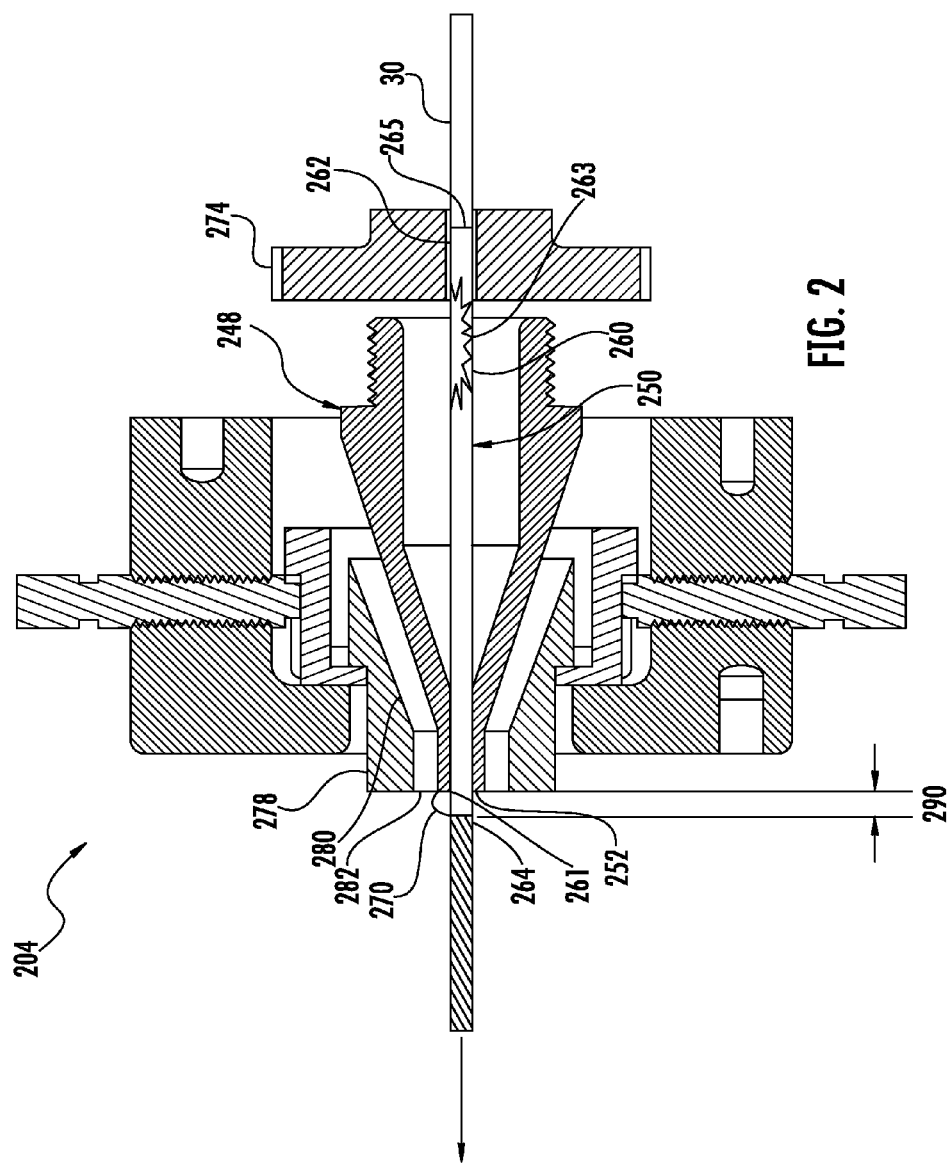
FIG. 2 is a schematic cross-sectional view of an explanatory extrusion system for making armored fiber optic assemblies.

The armor 150 can be formed by coextrusion methods. For example, the extrudate materials for the respective layers enter the extrusion tooling together, and may become strongly bonded together as the two extrudate materials solidify. The armor 150 can be essentially a unitary one-piece armor of two strongly bonded polymer materials, with a cross-section of the armor shown in U.S. application Ser. No. 12/748,925, filed Mar. 29, 12010 and published as US 2010/0260459, and may have the same or similar values for pitch, band thickness and other dimensions. FIG. 2 is a close-up, partial cross-sectional schematic view of an explanatory crosshead 204 used to armor fiber optic assemblies, as viewed in the Y-Z plane, that can be used to form the inner spiral layer 162 of the assembly shown in FIG. 1. The crosshead 204 includes a tip 248 having a central channel 250 with an output end 252 and in which is arranged a profile tube 260 having an outer surface 261, an inner surface 262 that defines a tube interior 263, a proximal (output) end 264, and a distal end 265. A profiling feature 270 is located on outer surface 261 at output end 252. In an example embodiment, the profiling feature 270 is a protrusion such as a nub or a bump. The profile tube interior 263 is sized to accommodate the fiber optic assembly 30 as it advances axially through the interior 263. The profile tube distal end 265 is centrally engaged by a gear 274 that, in turn, is driven by a motor (not shown) in a manner such that the profile tube 260 rotates within channel 250.

The crosshead 204 further includes a die 278 arranged relative to the tip 248 to form a cone-like material channel 280 that generally surrounds the central channel 250 and that has an output end 282 in the same plane as channel output end 252. The material channel 280 is connected to the extruder interior 201 so as to receive extrusion material 232 therefrom and through which flows the extrusion material during the extrusion process to form the inner spiral layer 162. In the example embodiment of the crosshead 204 of FIG. 2, a profile tube output end 265 extends beyond the channel output end 252 such that the profiling feature 270 thereon resides adjacent material channel output end 282. In an example embodiment, the profile tube 260 and the tip 248 are integrated to form a unitary, one-piece tool.

In forming armored fiber optic assemblies, extrusion material (not shown) flows through the material channel 280 and out of the material channel output end 282. At the same time, the fiber optic assembly 30 is fed through the profile tube interior 263 and out of profile tube output end 864 (and thus through the tip 248 and the die 278). In the meantime, the profile tube 260 is rotated via the gear 274 so that profiling feature 270 redirects (i.e., shapes) the flow of the extrusion material as it flows about fiber the optic assembly 30. As the fiber optic assembly 30 moves through the profile tube output end 264, the circular motion of the profiling feature 270 diverts the flow of extrusion material. The combined motion of the profiling feature 270 and the linear motion of fiber optic assembly 30 forms the spiral strip 162. The speed at which profile tube 260 rotates relative to the motion of fiber optic assembly 30 (which may also be rotating) dictates the pitch of the spiral strip 162. The axial position of the profiling feature 270 in relation to the material channel output end 282 can be varied as the feature rotates in order to, for example, form varying gaps between adjacent portions of the spiral strip 162.

To form the outer layer 164, a second, conventional extrusion head (not shown) can be arranged downstream and adjacent to the assembly shown in FIG. 2. The second extrusion head can apply a continuous outer jacket layer of non-conductive polymer material over the spiral strip inner layer 162.

Figure 3:
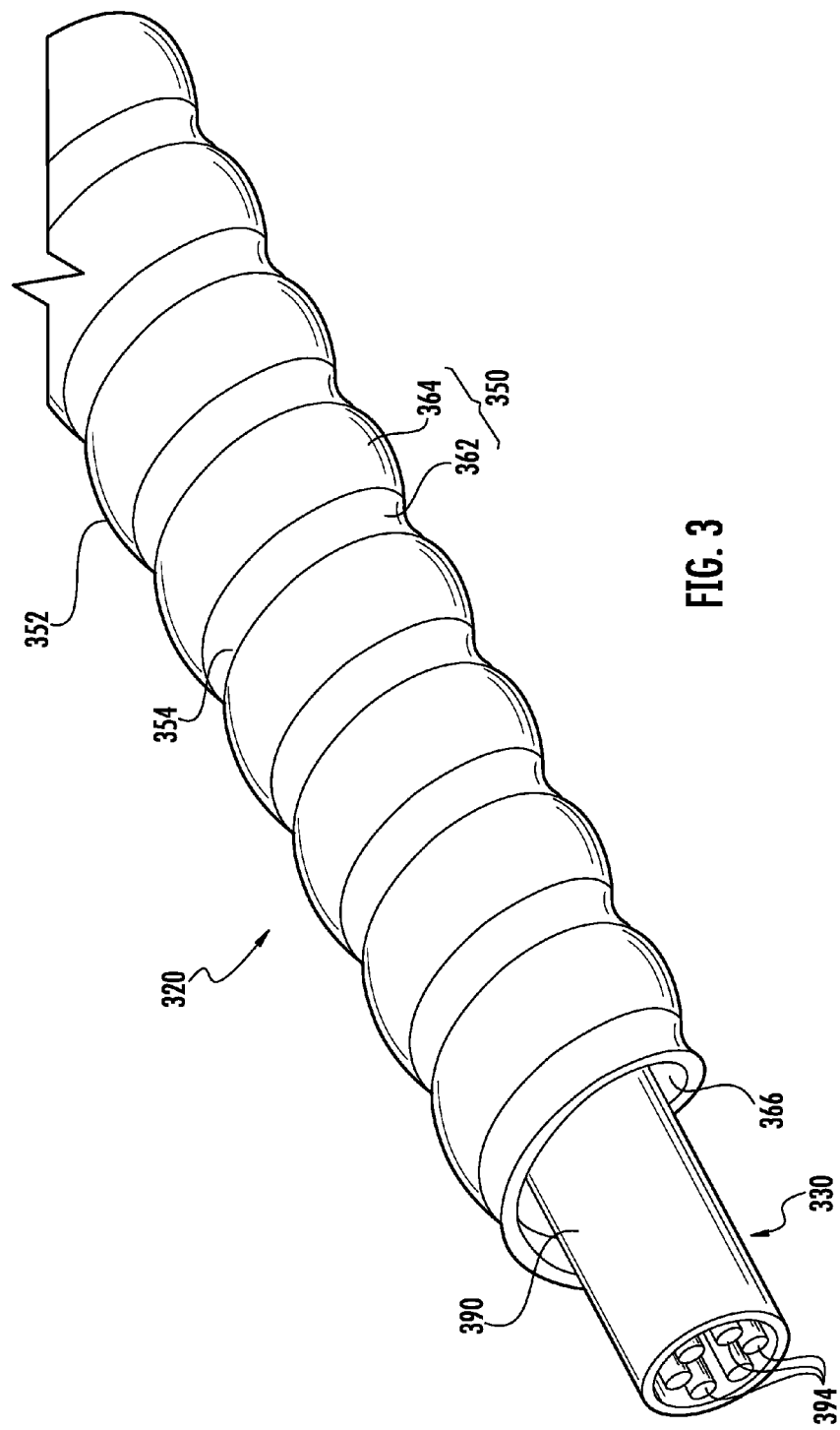
FIG. 3 is a perspective view of a second example embodiment of an armored fiber optic assembly.

FIG. 3 is a perspective cut-away view of an armored fiber optic assembly 320 including a core fiber optic assembly 30 disposed within a dielectric armor 350. The dielectric armor 350 is non-conductive and has an outer surface 352 that includes an armor profile 354 generally formed in a spiral along a longitudinal axis. The dielectric armor 350 is advantageous in that it both provides crush resistance and recovers to assume its original shape when subjected to crush loads. The dielectric armor 350 may also meet flame and/or smoke ratings, and does not require electrical grounding.

The dielectric armor 350 includes an inner layer 362 and an outer layer 364 disposed on the outer surface of the inner layer 362. According to one aspect of the present embodiment, the outer layer 364 can have the shape of a spiral "strip" that winds around the exterior of the inner layer 362. The inner layer 362 can be less rigid than the outer, spiral layer 364. Accordingly, the Shore D hardness of the inner layer 362 can be less than the Shore D hardness of the outer jacket layer 364. An inner surface 366 of the inner layer 362 may also have an armor profile.

In the illustrated embodiment, the inner layer 362 has a continuous annular cross-section. The exemplary outer layer 364 has the form of a strip wound around the inner layer 362 so that portions of the inner layer 362 are visible. The outer layer 364 can be extruded directly onto the inner layer 362 so that the two layers are bonded or adhered together. The outer layer 364 may be constructed of a relatively rigid polymer, while the inner layer 362 can be relatively less rigid. The relatively rigid outer layer 364 accordingly provides tensile strength, resistance to crush, and other robust properties. However, because the outer layer 364 has the shape of a spiral strip, and because the inner layer 362 can be relatively less rigid, the armored fiber optic assembly 320 can be relatively flexible and easy to bend. The thickness, width, and composition of the "strip" that forms the outer layer 364 can be selected to provide desirable mechanical properties. In general, the outer layer 364 covers at least one quarter of the surface area of the inner layer 362. The fiber optic assembly 330 is housed within and protected by the dielectric armor 350.

In the illustrated embodiment, the fiber optic assembly 330 can be similar to the core assembly 30 shown in FIG. 1, and may be separated from the core assembly 330 by a free space or separation distance. An average or median separation ΔR can therefore be calculated as ΔR=RI−RC, where RI is the average inside radius of the armor, and RC is the average outside radius of the core assembly.

As an alternative to the outer layer 364 only covering certain portions of the inner layer 362, the outer layer could cover the entirety of the inner layer 362. Further, the inner layer 362 can have the form of a spiral strip wound around the fiber optic assembly, with the outer layer 364 filling in gaps in the wound strip, as well as covering the exterior of the inner layer 364. The outer layer 364 can be less rigid than the inner layer 362 so that the resultant armored assembly has desirable bend properties.

As another alternative, to two layers 362, 364 can be interlocked spirals wound in the same direction. The armor 350, comprised of the two interlocked spirals, would have a continuous annular cross section. The interlocked spirals can have a continuous annular cross section with an armor profile. The armor 350 can be formed by coextrusion methods. For example, the extrudate materials for the respective layers enter the extrusion tooling together, and may become strongly bonded together as the two extrudate materials solidify. The armor 350 can be essentially a unitary one-piece armor of two strongly bonded polymer materials, with a cross-section of the armor shown in U.S. application Ser. No. 12/748,925, filed Mar. 29, 2010, and may have the same or similar values for pitch, band thickness and other dimensions.

Figure 4:
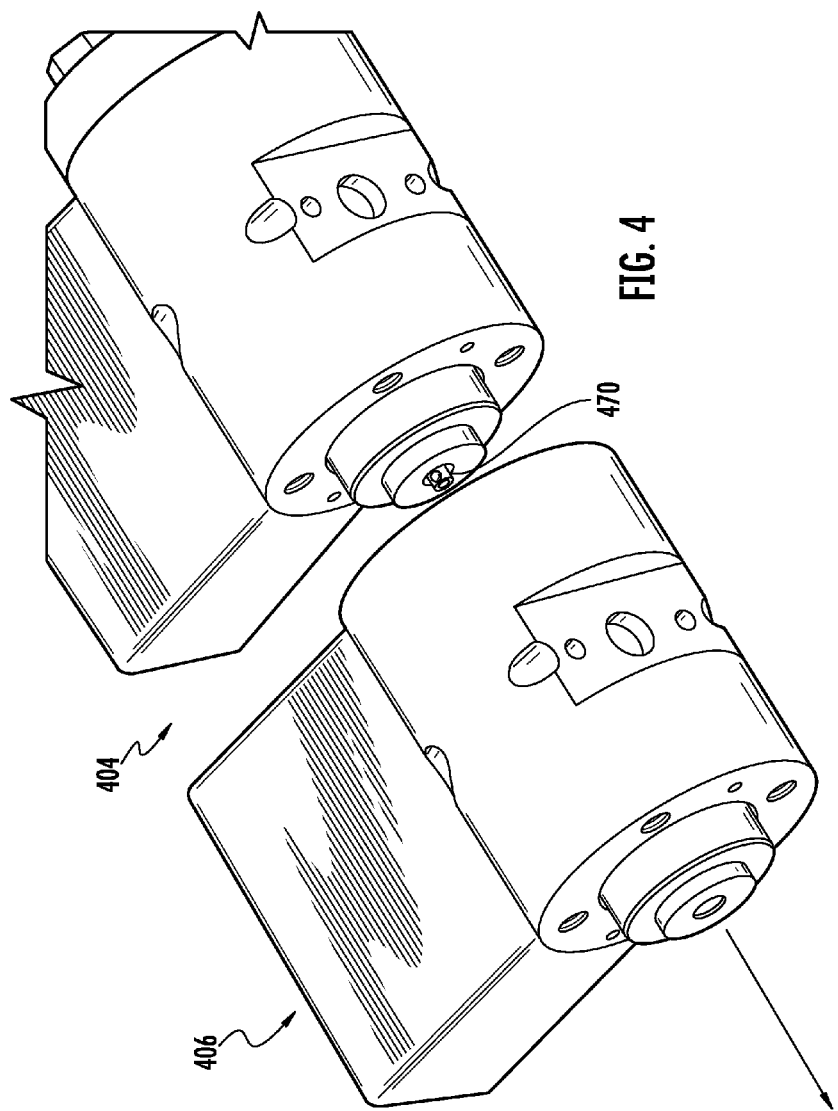
FIG. 4 is a schematic cross-sectional view of an explanatory extrusion system for making armored fiber optic assemblies.

FIG. 4 is a perspective view of an explanatory extrusion apparatus 400, that can be used to form the inner and outer armor layers. The extrusion apparatus 400 includes a first extrusion head 404 and a second extrusion head 406 that can be arranged end-to-end with the first head 404. In the exemplary embodiment, the first extrusion head 404 includes a profiling feature 470 that can rotate in order to form varying gaps in a flow of extrudate to form a spiral strip. In such an application, the first extrusion head 404 would typically form the inner armor layer. Therefore, in the arrangement of FIG. 4, the fiber optic assembly shown in FIG. 1 could be produced by the apparatus 400 by extruding the inner, spiral strip layer 162 formed by the extrusion head 404, and the outer continuous layer 164 formed over the inner layer 162 by the second extrusion head 406. The illustrated second extrusion head 406 does not include a profiling feature and can be conventional in form and operation.

The extrusion apparatus 400 can be modified to form the fiber optic assembly 320 as shown in FIG. 3. In this application, both the first extrusion head 404 and the second extrusion head 406 would be equipped with profiling features. The first extrusion head 404 would form the inner layer 362 with a continuous armor profile. The second extrusion head 406 would form the outer, spiral strip layer 364 over the continuous inner layer 362 by interrupting the flow of extrudate to form a spiral strip over the inner layer. While the extrusion apparatus 400 is shown as two separate heads 404, 406, it could be combined as a single, "coextrusion" head that is capable of forming two or more dielectric layers.

Figure 5:
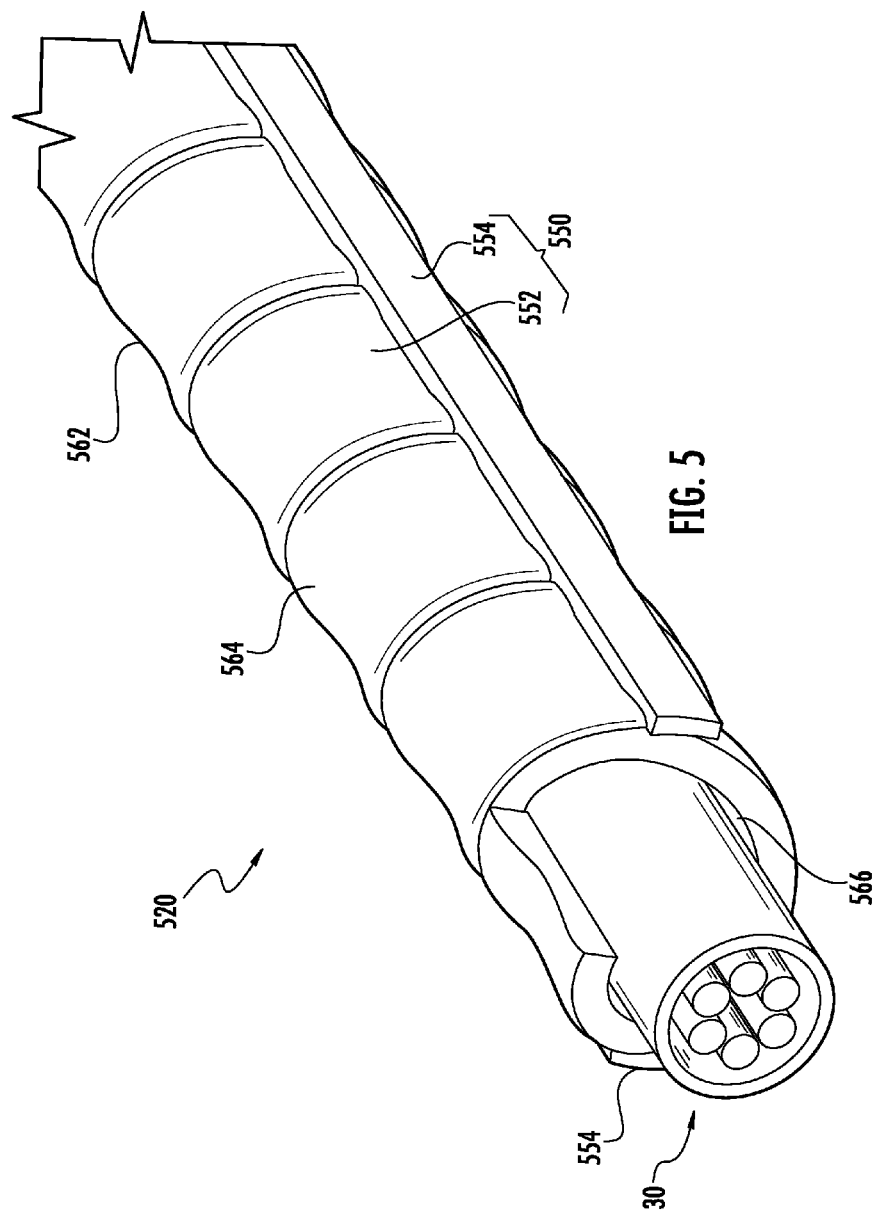
FIG. 5 is a perspective view of a third example embodiment of an armored fiber optic assembly.

FIG. 5 is a perspective cut-away view of an armored fiber optic assembly 520 including a core fiber optic assembly 30 disposed within a dielectric armor 550. The dielectric armor includes a tubular portion 552 and a pair of rod-like elongated rails 554 extending along each side of the armor 550. The tubular portion 552 has an outer surface 562 having an armor profile 564 generally formed in a spiral along a longitudinal axis. An inner surface 566 of the armor 550 may also have an armor profile. In the illustrated embodiment, the armor 550 has a continuous annular cross-section.

Figure 6:
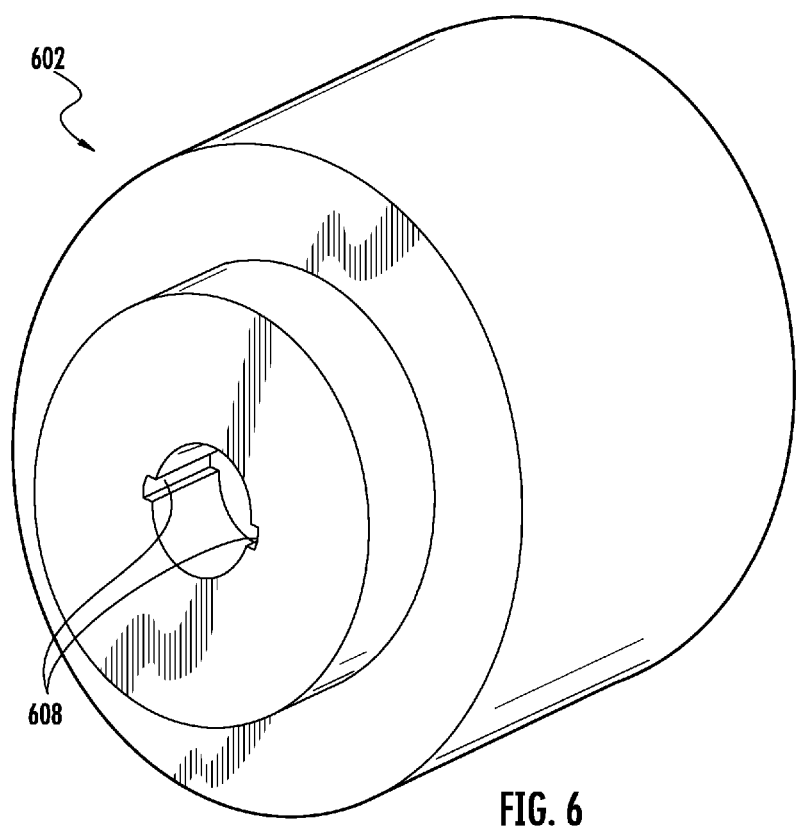
FIG. 6 is a perspective view of a portion of an extrusion die that can be used to form the fiber optic assembly of FIG. 5.

The tubular portion 552 is illustrated as comprising a single layer of dielectric material. The tubular portion 552 can be similar in cross-section to the armor shown in U.S. application Ser. No. 12/748,925, filed Mar. 29, 2010, and may have the same or similar values for pitch, band thickness and other dimensions. The inclusion of the rails 554, however, provides increased tensile strength, allowing reduced thickness of the tubular portion 552. The rails 554 are shown as having rectangular sections on the sides of the rails distal to the armor center. Other cross-sections, however, such as curved, oval, arcuate, etc. may also be used for the elongate rails 554. The armor 550 need not be secured to the core assembly 30 and may be separated from the core assembly 30 by a free space or median separation distance. The rails 554 and the tubular portion 552 can be extruded from a common extrudate material in the same crosshead and can form a uniform, continuous piece. FIG. 6 is a close-up, partial cross-sectional schematic view of an explanatory profiling die 602. The die 602 can be used in place of the die 278 (FIG. 2), for example, to form the elongate rails 554 of the armored fiber optic assembly 520. The channels 608 on either side of the die 602 allow additional extrudate to flow on the sides of the armor to form the elongate rails. The rails need not be continuous, and can be interrupted so that a series of rails are attached to the tubular portion. All or some rails could alternatively be located on the inside of the tubular portion 552.

Figure 7:
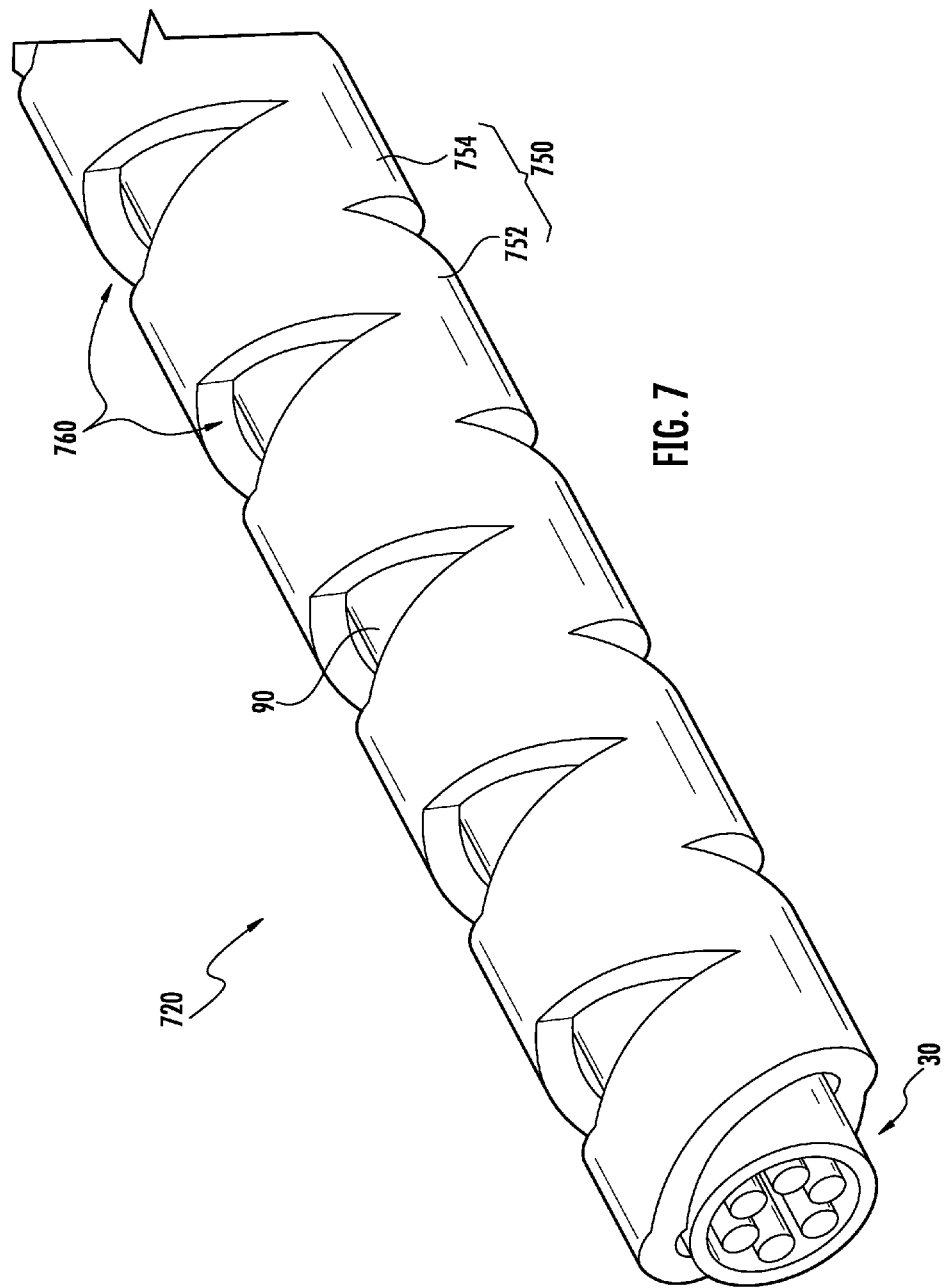
FIG. 7 is a perspective view of a fourth example embodiment of an armored fiber optic assembly.

FIG. 7 is a perspective cut-away view of an armored fiber optic assembly 720 including a core fiber optic assembly 30 disposed within a dielectric armor 750. The dielectric armor includes a first spiral portion 752 and a second spiral portion 754 that are wound in opposite directions and that intersect one another. The spiral portions 752, 754 have the form of spirally round flat strips of generally rectangular cross section. The counterwound spiral form of the armor 750 provides flexibility to the armor that also prevents the spiral portions 752, 754 from collapsing onto the core assembly 30. The armor 750 need not be secured to the core assembly 30 and may be separated from the core assembly 30 by a free space or separation distance. The armor 750 includes generally diamond shaped, curved openings 760 through which the core assembly is visible. This armor 750 can be formed by two counterrotating profiling projections. For example, in the configuration shown in FIG. 4, both extrusion crossheads 404, 406 could be provided with profiling features arranged to form spiral strips that rotate in opposite directions and overlap. Alternatively, the openings 760 can be formed in the armor by intermittently blocking the flow of extrudate.

By way of example, the core fiber optic assemblies 30, 330 discussed in the context of the above-described embodiments may be a stranded tube cable, monotube cable, micromodule cable, slotted core cable, loose fibers, tube assemblies, or the like. Additionally, fiber optic assemblies according to the present embodiments can include any suitable components such as water-blocking or water-swelling components, flame-retardant components such as tapes, coatings, or other suitable components. The fiber optic assembly 30 may have any suitable fiber count such as 6, 12 or 24-fiber MIC® cables available from Corning Cable Systems of Hickory, N.C. The core assemblies shown in the present embodiments can be separated from the interior surface of the armor by a median separation in the range of about 0.1-1.5 millimeters. Alternatively, the armor can be relatively tightly conforming to the surface of the core assembly.

The embodiments discussed above may describe specific materials for assembly components to meet desired mechanical and burn characteristics. In general, if intended for indoor use, the armored fiber optic assemblies may be flame-retardant and may have a desired flame-retardant rating depending on the intended space, such as plenum-rated, riser-rated, general-purpose, low-smoke zero-halogen (LSZH), or the like. Suitable polymer materials for the armors may be selected from one or more of the following materials to meet the desired rating: polyvinyl chloride (PVC), polyvinylidene fluoride (PVDF), flame-retardant polyethylene (FRPE), chlorinated polyvinyl chloride (CPVC), polytetraflourethylene (PTFE), polyether-ether keytone (PEEK), Fiber-Reinforced Polymer (FRP), low-smoke zero-halogen (LSZH), polybutylene terephthalate (PBT), polycarbonate (PC), polyethylene (PE), polypropylene (PP), polyethylene terephthalate (PETE), and acrylonitrile-butadiene-styrene (ABS). PVCs available from Teknor Apex under the tradenames FG RE 8015A, 8015B and 8015D may also be used. In this specification, the terms "polymer" and "polymeric" indicate materials comprised primarily of polymers, but allow for the inclusion of non-polymer additives and other materials, such as fire-retardant compounds, etc., and the inclusion of multiple polymers in a blend. The term "polymer" is intended to encompass copolymers, for example.

It will be apparent to those skilled in the art that various modifications and variations can be made to the present invention without departing from the spirit and scope of the invention.

We claim:

1. An armored fiber optic assembly, comprising:
   a fiber optic assembly having at least one optical fiber; and
   a dielectric armor surrounding the fiber optic assembly, the dielectric armor comprising:
      an inner dielectric layer surrounding the fiber optic assembly, wherein the inner layer has an armor profile; and
      an outer dielectric layer formed from a single strip with gaps spirally wound around the inner layer and bonded thereto.

2. The armored fiber optic assembly of claim 1, wherein the outer layer covers at least 25% of the exterior surface of the inner layer.

3. The armored fiber optic assembly of claim 1, wherein the outer layer has a Shore D hardness that is higher than a Shore D hardness of the inner layer.

4. The armored fiber optic assembly of claim 1, wherein the outer layer is more rigid than the inner layer and the inner layer has a continuous annular cross-section.

5. The armored fiber optic assembly of claim 1, wherein the armored fiber optic assembly has a median separation in the range of about 0.1-1.5 millimeters between the fiber optic assembly and an interior of the dielectric armor, and wherein the armor profile of the inner layer has a pitch P between about 5 millimeters and about 30 millimeters and a groove length that is between about 20 percent and 80 percent of the pitch P.

6. The armored fiber optic assembly of claim 1, wherein the dielectric armor has an outside diameter in the range of 5-15 millimeters, and wherein the inner layer is a PVC and the outer layer is a PVC.

7. An armored fiber optic assembly, comprising:
   a fiber optic assembly having at least one optical fiber; and
   a dielectric armor surrounding the fiber optic assembly, the dielectric armor comprising:
      an inner dielectric layer spirally wound around the fiber optic assembly, wherein the inner dielectric layer has the shape of a single helical strip with gaps; and
      an outer dielectric layer surrounding the inner layer and bonded thereto, wherein the outer dielectric layer has an armor profile and fills in the gaps of the wound strip.

8. The armored fiber optic assembly of claim 7, wherein the inner layer has a Shore D hardness that is higher than a Shore D hardness of the outer layer.

9. The armored fiber optic assembly of claim 8, wherein the armored fiber optic assembly has a median separation in the range of about 0.1-1.5 millimeters between the fiber optic assembly and an interior of the dielectric armor.

10. The armored fiber optic assembly of claim 8, wherein an armor profile of the outer layer has a pitch P between about 5 millimeters and about 30 millimeters and a groove length that is between about 20 percent and 80 percent of the pitch P.

11. The armored fiber optic assembly of claim 8, wherein the dielectric armor has an outside diameter in the range of 5-15 millimeters, and wherein the inner layer is a PVC and the outer layer is a PVC.

* * * * *